(12) United States Patent
Li et al.

(10) Patent No.: US 12,295,803 B2
(45) Date of Patent: May 13, 2025

(54) INTEGRATED ORAL CARE APPARATUS

(71) Applicant: SHENZHEN SOOCAS TECHNOLOGY CO., LTD., Guangdong (CN)

(72) Inventors: Junhui Li, Guangdong (CN); Fandi Meng, Guangdong (CN)

(73) Assignee: SHENZHEN SOOCAS TECHNOLOGY CO., LTD., Shenzhen (CN)

( * ) Notice: Subject to any disclaimer, the term of this patent is extended or adjusted under 35 U.S.C. 154(b) by 159 days.

(21) Appl. No.: 18/175,867

(22) Filed: Feb. 28, 2023

(65) Prior Publication Data

US 2024/0041579 A1 Feb. 8, 2024

(30) Foreign Application Priority Data

Aug. 5, 2022 (CN) .......................... 202210938586.0

(51) Int. Cl.
*A61C 17/22* (2006.01)
*A61C 17/024* (2006.01)

(52) U.S. Cl.
CPC .......... *A61C 17/222* (2013.01); *A61C 17/024* (2019.05); *A61C 17/225* (2013.01)

(58) Field of Classification Search
CPC .... A61C 17/222; A61C 17/024; A61C 17/225
See application file for complete search history.

(56) References Cited

U.S. PATENT DOCUMENTS 8,522,384 B2    9/2013   Leung
11,399,925 B2   8/2022   Sokol et al.
(Continued)

FOREIGN PATENT DOCUMENTS

AU    2004202070 A1   7/2004
CN      101012857 A    8/2007
(Continued)

OTHER PUBLICATIONS

Notification to Grant Patent Right for Invention of corresponding Chinese Application No. 202210938586.0, dated Feb. 2, 2024, 7 pages.
(Continued)

*Primary Examiner* — Shay Karls
(74) *Attorney, Agent, or Firm* — Tucker Ellis LLP

(57) ABSTRACT

The present application provides an integrated oral care apparatus, including: an uneven housing, a composite member, a medium supply unit, a vector generation unit and a medium delivery member, where the uneven housing has a main extension line and oppositely arranged first end and second end, the main extension line extends from the first end of the uneven housing to the second end of the uneven housing, the vector generation unit connects with the composite member through a vector transmission rod, the vector transmission rod has a medium conveying channel, and the first end of the medium conveying channel is communicated with the composite member; the medium delivery member is configured to bridge between the vector generation unit and the medium supply unit, and has a communication channel, and the communication channel is hermetically coupled between the second end of the medium conveying channel and the medium supply unit.

18 Claims, 10 Drawing Sheets

(56) References Cited

U.S. PATENT DOCUMENTS

| | | |
|---|---|---|
| 2005/0159711 A1 | 7/2005 | Kathrani et al. |
| 2017/0238688 A1 | 8/2017 | Wu et al. |
| 2021/0059394 A1 | 3/2021 | Ruiz |
| 2021/0289930 A1 | 9/2021 | Wagner |
| 2022/0211166 A1 | 7/2022 | Wagner |

FOREIGN PATENT DOCUMENTS

| | | |
|---|---|---|
| CN | 102131422 A | 7/2011 |
| CN | 102912455 A | 2/2013 |
| CN | 103195237 A | 7/2013 |
| CN | 205674814 U | 11/2016 |
| CN | 211156421 U | 8/2020 |
| CN | 211902041 U | 11/2020 |
| CN | 114010355 A | 2/2022 |
| CN | 216724839 U | 6/2022 |
| EP | 3 831 340 A1 | 6/2021 |
| KR | 10-1861735 B1 | 7/2018 |
| RU | 2673202 C1 | 11/2018 |
| RU | 2688392 C2 | 5/2019 |
| WO | 2018/065747 A1 | 4/2018 |
| WO | 2020/016547 A1 | 1/2020 |

OTHER PUBLICATIONS

European Search Report of corresponding European Application No. 23159610.7, dated Dec. 13, 2023, 12 pages.
Office Action of corresponding Chinese Application No. 202210938586.0, dated Jun. 28, 2023, 10 pages.
Office Action of corresponding Russian Application No. 2023100536/14 (001036), dated Jun. 6, 2023, 16 pages.

INTEGRATED ORAL CARE APPARATUS

CROSS-REFERENCE TO RELATED APPLICATION

This application claims priority to Chinese Patent Application No. 202210938586.0, filed on Aug. 5, 2022, which is hereby incorporated by reference in its entirety.

TECHNICAL FIELD

The present application relates to the technical field of oral care, in particular to an integrated oral care apparatus.

BACKGROUND

As people attach importance to oral care, electric toothbrush and oral irrigator have gradually become common oral care tools in families.

At present, the electric toothbrush on the market only has the function of brushing teeth, and the oral irrigator only has the function of rinsing teeth. Therefore, people need to use the oral irrigator and the electric toothbrush respectively when nursing the oral cavity, which causes many inconveniences. Therefore, there is provided a multifunctional electric toothbrush in the prior art, including a toothbrush handle and a toothbrush head, where the toothbrush head is provided with a channel communicated with bristles, and the accommodating cavity of the toothbrush handle is provided with a conveying pipe communicated with the channel.

However, after the multifunctional electric toothbrush is used for a long time, the sealing reliability between the toothbrush head channel and the conveying pipe becomes deteriorated, and there is a hidden danger of leakage.

SUMMARY

In view of the above problems, embodiments of the present application provide an integrated oral care apparatus, which has higher sealing reliability between the toothbrush head channel and the conveying pipe.

To achieve the above object, embodiments of the present application provide the following technical solutions.

Embodiments of the application provide an integrated oral care apparatus, including: an uneven housing, configured to have a bionic gripping surface suitable for gripping, where the uneven housing has a main extension line, and a first end and a second end which are oppositely arranged, and the main extension line extends from the first end of the uneven housing to the second end of the uneven housing; a composite member, configured to remove foreign substances in a target area, where the composite member is close to the second end of the uneven housing and is far away from the first end of the uneven housing; a medium supply unit, configured to provide the composite member with a fluid medium for accelerating a removal of the foreign substances; a vector generation unit at least partially added to the uneven housing, where the vector generation unit connects with the composite member through a vector transmission rod having a medium conveying channel with a first end that is communicated with the composite member; a medium delivery member, configured to be bridged between the vector generation unit and the medium supply unit, the medium delivery member having a communication channel that is hermetically coupled between a second end of the medium conveying channel and the medium supply unit.

In some embodiments, the integrated oral care apparatus further includes: first sealing members, configured to be elastic, the first sealing members being at least partially filled in an assembly gap between the medium delivery member and the vector transmission rod, and an assembly gap between the medium delivery member and an outlet end of the medium supply unit, respectively.

In some embodiments, the first sealing member is internally provided with an expansion cavity that penetrates through an outer wall surface of the first sealing member, and the fluid medium is configured to be filled in the expansion cavity through the assembly gap.

In some embodiments, the expansion cavity extends along a circumferential direction of the communication channel.

In some embodiments, the first sealing member includes a fixing portion and an expansion portion, where the expansion portions are multiple, and multiple expansion portions are connected to a same end of the fixing portion along a flow direction of the fluid medium, and the multiple expansion portions are arranged at intervals along a radial direction of the communication channel, and two adjacent expansion portions enclose to form the expansion cavity.

In some embodiments, the medium delivery member includes a lead-in section and a lead-out section which are communicated with each other, the lead-out section is connected with the vector delivery rod in an insertion manner, and the lead-in section is connected with the outlet end of the medium supply unit in an insertion manner.

In some embodiments, a center line of an inner cavity of the lead-in section is spaced from a center line of an inner cavity of the lead-out section.

In some embodiments, the vector transmission rod is inserted into the lead-out section, and the outlet end of the medium supply unit is inserted into the lead-in section; inner wall surfaces of both ends of the communication channel are respectively provided with mounting grooves, the first sealing members are mounted in the mounting grooves, and openings of the expansion cavities of the first sealing members at both ends of the communication channel are oppositely arranged.

In some embodiments, the inner wall surface of the communication channel is provided with a guiding inclined plane, which is arranged at an open end of the expansion cavity of the first sealing member and has an included angle relative to the flow direction of the fluid medium and extends to the mounting groove.

In some embodiments, an end of the vector transmission rod far away from the composite member penetrates into the vector generation unit from an end of the vector generation unit close to the composite member, and passes through the vector generation unit from an end of the vector generation unit far away from the composite member.

In some embodiments, the vector transmission rod extends along the main extension line, and along an extension direction of the main extension line, the medium conveying channel penetrates through an end of the vector transmission rod far away from the composite member and an end of the vector transmission rod close to the composite member.

In some embodiments, the medium supply unit includes a medium conveying mechanism and a medium container that are arranged in the uneven housing; the medium container is arranged at one side deviated from the main extension line; along the extension direction of the main extension line, the medium conveying mechanism is separated from the vector generation unit by a preset distance, and the medium conveying mechanism is located on a side of the vector generation unit far away from the composite member; the medium conveying mechanism has a medium outflow end and a medium inflow end, where the medium outflow end is communicated with the communication channel, and the medium inflow end is communicated with the medium container through a pipeline.

In some embodiments, the medium container includes an outer wall which is integrated with the bionic gripping surface, and an inner wall which is connected with the outer wall and extends along the main extension line, and the inner wall and the outer wall together form a closed special-shaped cavity extending along the main extension line, and the closed special-shaped cavity is configured to store the fluid medium.

In some embodiments, the bionic gripping surface includes a first profiling gripping surface and a second profiling gripping surface which are asymmetrically distributed relative to the main extension line, and the first profiling gripping surface and the second profiling gripping surface are spliced to form a closed annular surface.

In some embodiments, a distance of the first profiling gripping surface relative to the main extension line varies from being equal to being gradually decreased, from the first end of the uneven housing to the second end of the uneven housing, along the extension direction of the main extension line.

In some embodiments, the composite member includes a support head which is latchably connected with an end of the vector transmission rod far away from the vector generation unit, and the support head is internally provided with a medium guide channel which is communicated with the medium conveying channel, a center line of the medium guide channel is arranged on the main extension line; the supporting head is provided with a bristle planting surface, and a plurality of bundles of bristles are planted on the bristle planting surface at intervals, and a depth of the plurality of bundles of bristles planted on the bristle planting surface is not more than a distance from the bristle planting surface to the main extension line; the bristle planting surface is provided with a splash hole that is communicated with the medium guide channel.

In some embodiments, an inner pore size of the medium guide channel is matched with an outer diameter of the vector transmission rod; the medium guide channel has a bonding surface parallel to the main extension line, an end of the vector transmission rod far away from the vector generation unit is inserted into the medium guide channel by a certain distance, and a part of the vector transmission rod located in the medium guide channel has a milling plane matched with the bonding surface.

In some embodiments, the composite member further includes a first spatial position holding member, a second sealing member and a second spatial position holding member, where the first spatial position holding member, the second sealing member and the second spatial position holding member are arranged in the support head along the flow direction of the fluid medium; the first spatial position holding member, the second sealing member and the second spatial position holding member all have internal cavities which are communicated with each other and constitute part of the medium guide channel; the first spatial position holding member is connected with the support head in a clamping manner, so as to fix the second sealing member and the second spatial position holding member in the medium guide channel; where, the bonding surface is arranged on an inner wall surface of the second spatial position holding member, and the second sealing member is configured to fill at least part of a space between the vector transmission rod and the support head, and the vector transmission rod is connected with the first spatial position holding member in a clamping manner.

In some embodiments, the second spatial position holding member is provided with a connecting through hole which is opposite to the bonding surface, and the second spatial position holding member is provided with an elastic arm arranged in the connecting through hole, and the elastic arm is configured to press against the vector transmission rod through its own elastic structure.

In some embodiments, the composite member further includes an elastic clamping member, the elastic clamping member is connected with the first spatial position holding member, and a clamping portion of the elastic clamping member extends into the internal cavity of the first spatial position holding member; the outer wall surface of the vector transmission rod is provided with a clamping groove, and the clamping portion of the elastic clamping member is clamped in the clamping groove in an openable and closable manner.

Compared with the prior art, the integrated oral care apparatus provided by the embodiment of the application has the following advantages.

Embodiments of the present application provide an integrated oral care apparatus, including a vector generation unit, a composite member and a medium supply unit, where the vector generation unit is connected with the composite member through a vector transmission rod, the vector transmission rod is integrated with a medium conveying channel, the medium supply unit and the composite member is communicated merely through the medium conveying channel therebetween, that is, the medium supply unit provides the composite member with a medium for removing foreign substances through the medium conveying channel, so as to enable the composite member to remove foreign substances in a target area. In this way, there is no need to set another conveying pipe in the housing between the medium supply unit and the composite member, so that the contour size of the housing between the medium supply unit and the composite member can be reduced, thus the overall contour of the housing is reduced, so as to improve the user's gripping comfort.

In addition, by setting a medium delivery member between the vector transmission rod and the medium supply unit, the medium delivery member is respectively in sealed communication with the medium supply unit and the vector transmission rod, so that there is a better sealing performance between the medium delivery member and the medium supply unit and between the medium delivery member and the vector transmission rod, that is, the sealing reliability between the vector transmission rod and the medium supply unit is higher.

In addition to the technical problems solved by the above-described embodiments of the present application, the technical features constituting the technical solutions and the beneficial effects brought by these technical solutions, other technical problems solved by the integrated oral care apparatus provided by the embodiments of the present application, other technical features included in the technical solutions and the beneficial effects brought by these technical features will be further explained in detail in the specific embodiments.

BRIEF DESCRIPTION OF DRAWINGS

In order to more clearly explain the technical solutions in the embodiments of the present application or in the prior art, the following will briefly introduce the drawings required to be used in the description of the embodiments or the prior art. Obviously, the drawings in the following description are some embodiments of the present disclosure. For those with ordinary skills in the art, other drawings can also be obtained according to these drawings without any creative labor.

REFERENCE NUMERALS

Figure 1:
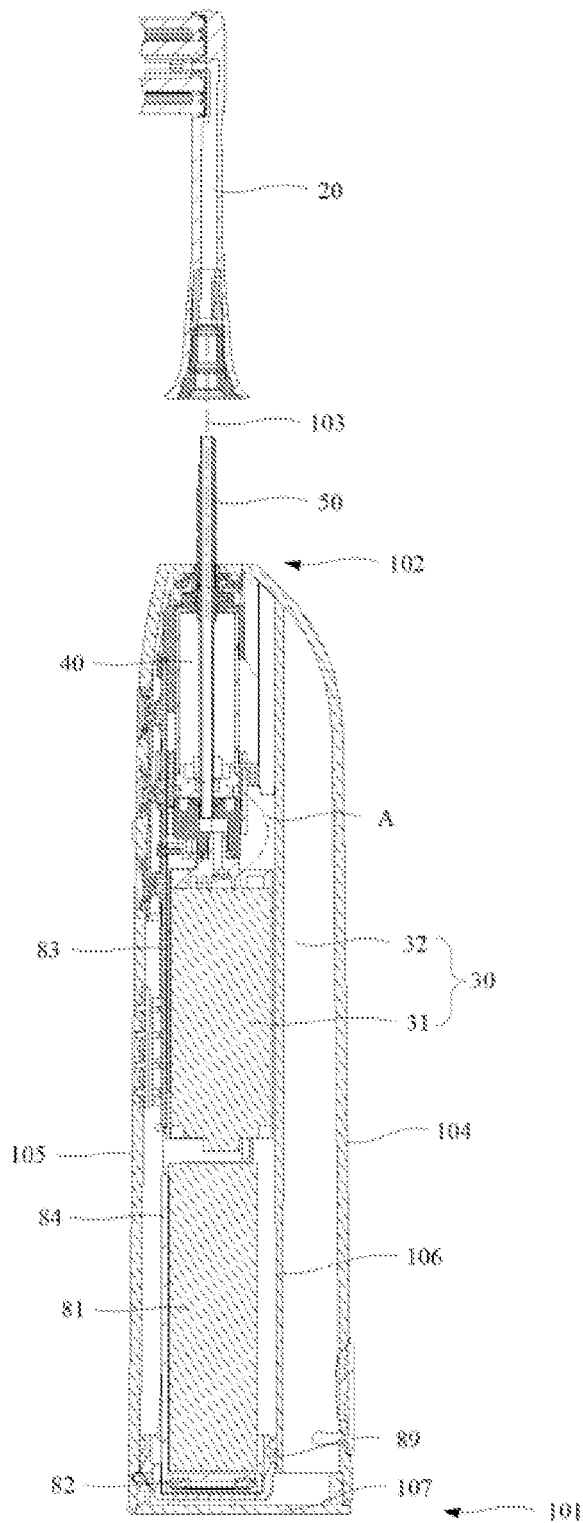
FIG. 1 is a structural schematic diagram of an integrated oral care apparatus according to some embodiments of the present application.
Figure 2:
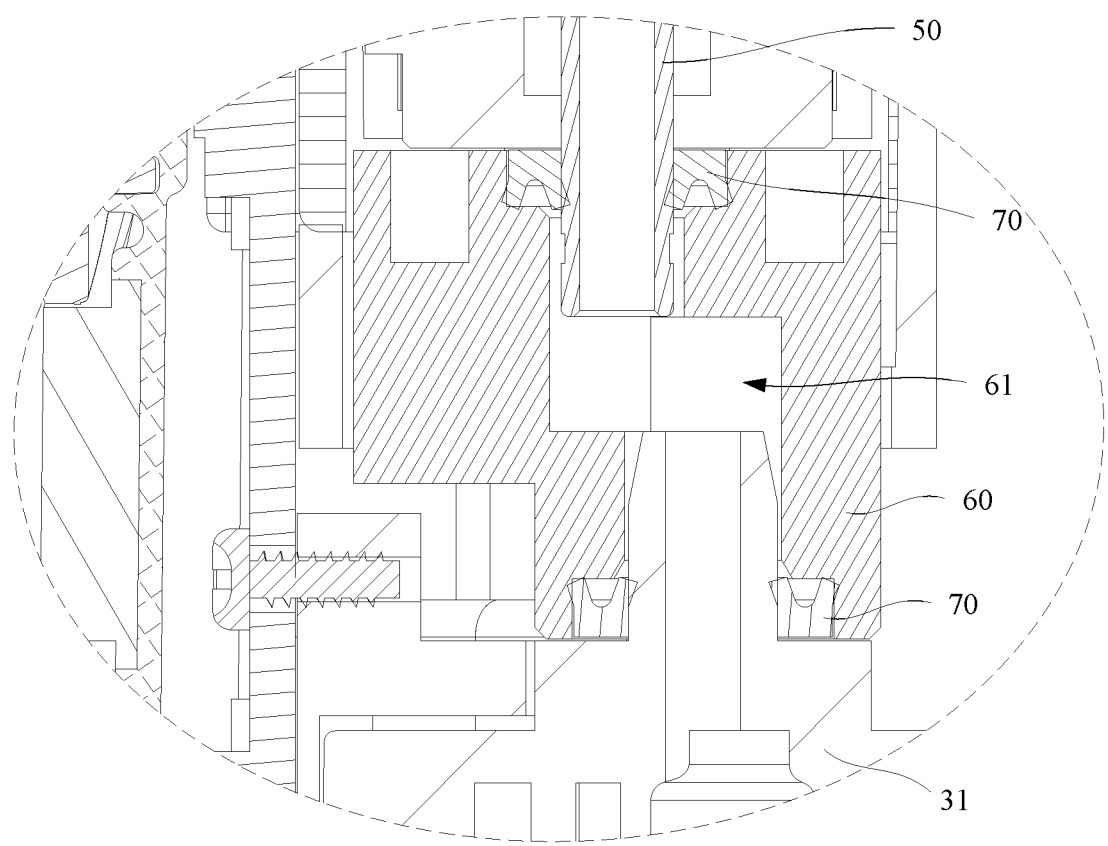
FIG. 2 is a partially-enlarged structural schematic diagram of part A in FIG. 1.

10—Uneven housing;
101—First end; 102—Second end; 103—Main extension line; 104—First profiling gripping surface; 105—Second profiling gripping surface; 106—Inner wall; 107—Closure cover;
20—Composite member;
21—Support head; 211—Guide protrusion;
22—Medium guide channel;
23—Bristle;
24—Splash hole;
25—First spatial position holding member; 251—Clamping protrusion; 252—Positioning groove; 253—Mounting hole;
26—Second sealing member;
27—Second spatial position holding member; 271—Bonding surface; 272—Elastic arm; 273—Connecting through hole;
28—Elastic clamping member; 281—Clamping portion; 282—Bending portion;
29—Nozzle member;
30—Medium supply unit;
31—Medium conveying mechanism; 311—Medium inflow end; 312—Medium outflow end;
32—Medium container; 33—Conveying pipe;
40—Vector generation unit;
50—Vector transmission rod; 51—Medium conveying channel; 52—Milling plane; 53—Clamping groove;
60—Medium delivery member; 61—Communication channel; 62—Lead-in section; 63—Lead-out section; 64—Connection section; 65—Mounting groove; 66—Guiding inclined plane;
70—First sealing member; 71—Expansion cavity; 72—Fixing portion; 73—Expansion portion;
81—Power supply module; 82—Charging module; 83—Control panel; 84—Combination bracket; 85—Waterproof member; 86—Support member; 87—First shock-absorbing pad; 88—Second shock-absorbing pad; 89—Tail cover; 891—Tail channel.

DESCRIPTION OF EMBODIMENTS

In order to make the above purposes, features and advantages of the embodiments of the present application more obvious and understandable, the technical solutions in the embodiments of the present application will be described clearly and completely with reference to the accompanying drawings in the embodiments of the present application. Obviously, the embodiments to be described are only part of the embodiments of the present application, not all embodiments. Based on the embodiments in the present application, all other embodiments obtained by those ordinary skilled in the art without creative labor are within the scope of protection of the present application.

As mentioned in the background art, in the multifunctional electric toothbrush in the related art, the sealing reliability between a toothbrush head channel and a conveying pipe decreases, and the leakage between the toothbrush head channel and the conveying pipe easily occurs. According to the inventor's research, the reason for this problem is that when an electric toothbrush is running, the relative vibration amplitude between the toothbrush head channel and the conveying pipe is relatively large, and the water pressure at a water outlet end of a pump body is too large, which leads to the fatigue deformation of the sealing structure and the reduction of the sealing reliability.

To solve the above problem, an embodiment of the present application provides an integrated oral care apparatus, including a vector generation unit, a composite member and a medium supply unit, where, the vector generation unit is connected with the composite member through a vector transmission rod; the vector transmission rod is integrated with a medium conveying channel; the medium supply unit and the composite member is communicated merely through the medium conveying channel therebetween, that is, the medium supply unit provides the composite member with a medium for removing foreign substances through the medium conveying channel, so as to enable the composite member to remove foreign substances in a target area. In this way, there is no need to additionally set a conveying pipe in a housing between the medium supply unit and the composite member, so that the contour size of the housing between the medium supply unit and the composite member may be reduced, thus the overall contour of the housing may be reduced, thereby improving the user's gripping comfort.

Meanwhile, by setting a medium delivery member between the vector transmission rod and the medium supply unit, a vibration amplitude between the vector transmission rod and the medium delivery member and a vibration amplitude between the medium supply unit and the medium delivery member may be reduced respectively, the influence of a fluid medium on a sealing structure may be dispersed, the fatigue life of the sealing structure may be improved, and the sealing reliability is higher.

Figure 3:
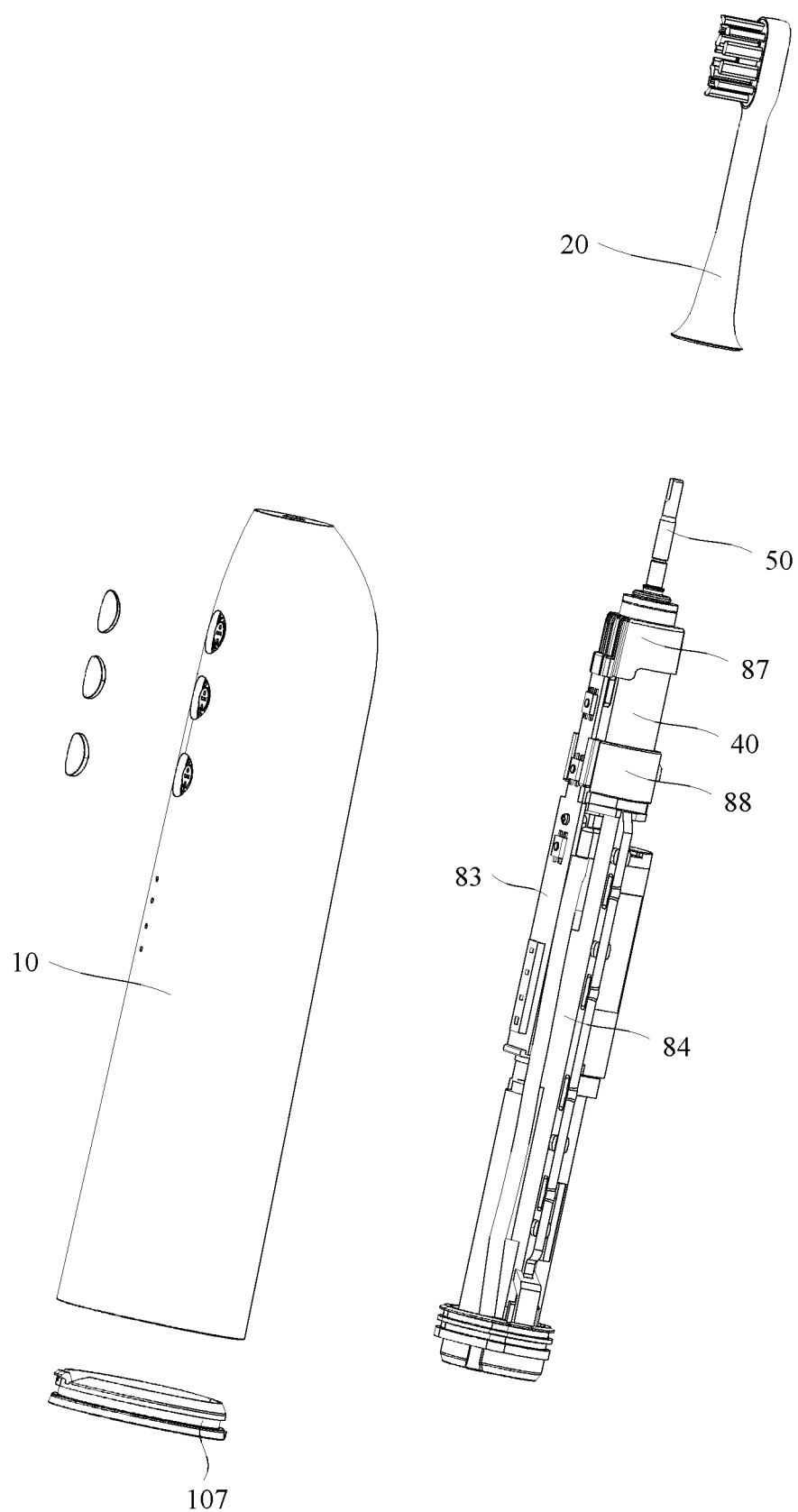
FIG. 3 is an exploded structural schematic diagram of the integrated oral care apparatus according to some embodiments of the present application.
Figure 4:
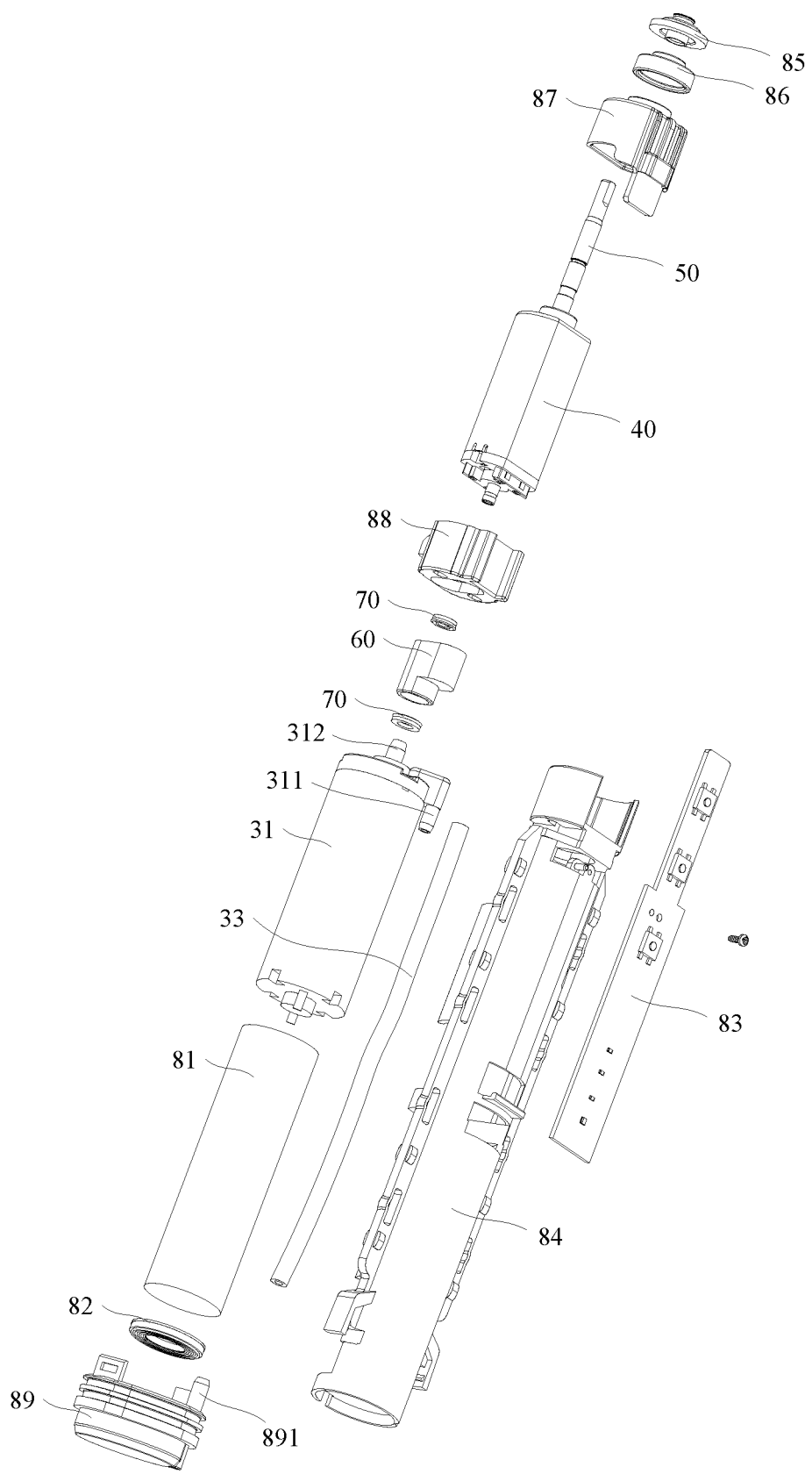
FIG. 4 is another exploded structural schematic diagram of the integrated oral care apparatus according to some embodiments of the present application.

Referring to FIGS. 1, 3 and 4, the present embodiment provides an integrated oral care apparatus for cleaning the user's mouth.

The integrated oral care apparatus includes an uneven housing 10. The uneven housing 10 may be a plastic member, has a small weight and is easy to hold.

The uneven housing 10 is configured to have a bionic gripping surface suitable for holding, that is, an outer wall surface of the uneven housing 10 is the bionic gripping surface, the term "bionic" means that the surface is suitable for the shape of a user's hand when the uneven housing 10 is gripped by a user. That is, when the user grips the uneven housing 10, the outer wall surface of the uneven housing 10 may be in contact with different positions of the user's hand. Users may use the integrated oral care apparatus with high comfort. Exemplarily, the uneven housing 10 is provided with a concave structure corresponding to the user's finger portion.

The uneven housing 10 has a main extension line 103, which extends from a first end 101 of the uneven housing 10 to a second end 102 of the uneven housing 10. That is, the main extension line 103 may be understood as a length direction of the uneven housing 10, and the uneven housing 10 is approximately a rod-shaped structure with a preset length in the direction of the main extension line 103. Correspondingly, in the direction of the main extension line 103, the uneven housing 10 has the first end 101 and the second end 102 which are arranged oppositely to each other, that is, the first end 101 and the second end 102 of the uneven housing 10 are respectively located at the opposite ends of the uneven housing 10.

The term "uneven" refers to a non-rotationally symmetrical structure, that is, the uneven housing 10 is a non-rotationally symmetrical housing, so as to be suitable for a gripping shape of the user's hand and improve the user's comfort.

In some embodiments, the bionic gripping surface includes a first profiling gripping surface 104 and a second profiling gripping surface 105 which are asymmetrically distributed relative to the main extension line 103, and the first profiling gripping surface 104 and the second profiling gripping surface 105 are spliced to form a closed annular surface.

The first profiling gripping surface 104 and the second profiling gripping surface 105 may be similar in shape, for example, they are both approximately cylindrical, and their structures are relatively simple. And the first profiling gripping surface 104 and the second profiling gripping surface 105 are arranged asymmetrically with respect to the main extension line 103, for example, the distance between the first profiling gripping surface 104 and the main extension line 103 is larger than that between the second profiling gripping surface 105 and the main extension line 103, so that they enclose a complete annular surface structure.

In some embodiments, the integrated oral care apparatus further includes a composite member 20, which is close to the second end 102 of the uneven housing 10 and far away from the first end 101 of the uneven housing 10, that is, the composite member 20 is installed at the second end 102 of the uneven housing 10.

The composite member 20 is configured to remove foreign substances in a target area. Where, the target area is the inside of the user's oral cavity, and the composite member 20 may be understood as a cleaning head for oral cavity cleaning. For example, the cleaning head includes a toothbrush head, and the toothbrush head removes foreign substances such as food residue attached to the user's teeth.

The integrate oral care apparatus may have different modes, such as a tooth brushing mode, a tooth rinsing mode, and a mixed mode which may simultaneously perform tooth brushing and tooth rinsing, depending on a type and a using mode of the composite member 20.

In some embodiments, the integrated oral care apparatus further includes a medium supply unit 30 configured to provide the composite member 20 with a fluid medium for accelerating a removal of foreign substances.

The fluid medium may be liquid or gas. When the fluid medium is liquid, the fluid medium may be water, or liquid mixed with a detergent, a disinfectant, etc. The medium supply unit 30 is a pumping unit that supplies the above-mentioned fluid medium to the composite member 20. Through the medium supply unit 30, the composite member 20 may be assisted in oral cleaning operation to optimize the oral cleaning effect.

In some embodiments, the integrated oral care apparatus further includes a vector generation unit 40, which is configured to output a motion vector and may be understood as a power member for the integrated oral care apparatus. Depending on an operation mode of the integrated oral care apparatus, the motion vector includes but is not limited to vibration, swing, etc.

The vector generation unit 40 is at least partially added into the uneven housing 10, that is, part of the vector generation unit 40 is located inside the uneven housing 10, part of the vector generation unit 40 is located outside the uneven housing 10, and the vector generation unit 40 that is located outside the uneven housing 10 extends to the outside of the uneven housing 10 and is connected with the composite member 20 to provide the motion vector to the composite member 20.

In some embodiments, the vector generation unit 40 further includes a vector transmission rod 50 with a rod-shaped structure, and the vector generation unit 40 connects with the composite member 20 through the vector transmission rod 50. Where, the vector generation unit 40 includes a power member for outputting a motion vector, and the vector transmission rod 50 penetrates into and is connected with the power member for transmitting the motion vector to the composite member 20.

That is, the vector transmission rod 50 spans the inner and outer sides of the uneven housing 10. One end of the vector transmission rod 50 that is located inside the uneven housing 10 is connected with the power member of the vector generation unit 40, and the other end of the vector transmission rod 50 that is located outside the uneven housing 10 is connected with the composite member 20, so that the motion vector output by the power member may be transmitted to the composite member 20 through the vector transmission rod 50.

In some embodiments, the power member in the vector generation unit 40 is capable of outputting an eccentric power, and the power member includes a driving shaft, which is connected with the vector transmission rod 50 penetrating into the vector generation unit 40, so as to transmit the eccentric power to the vector transmission rod 50, so that the composite member 20 vibrates or swings relative to the target area.

Exemplarily, the vector generation unit 40 provided by the embodiment of the present application may be a miniature reciprocating vibrator, such as an acoustic motor, and its power member includes a driving shaft, a stator and a rotor, where the stator includes a permanent magnet which is fixedly arranged, the driving shaft is inserted into the rotor, and the driving shaft is sleeved with an iron core block which is located in the permanent magnet and wound with a coil winding.

When the coil winding is energized by a forward direction current, the coil winding of the iron core block forms a magnetic field; and when the magnetic field interacts with a magnetic field of the permanent magnet, the rotor swings counterclockwise for a certain angle. On the contrary, when the coil winding is energized by a reverse direction current, a magnetic field formed by the coil winding of the iron core block has a direction which is opposite to that of the previous magnetic field, and when the magnetic field interacts with the magnetic field of the permanent magnet, the rotor swings in a reverse direction for a certain angle. When the coil is alternately energized forward and backward at a preset frequency, the rotor will swing back and forth according to this frequency; while in a non-energized state, the iron core block will be positioned at a middle position of the two opposite poles of the permanent magnet under the balance of the attractive forces therebetween.

In some embodiments, referring to FIGS. 1-4 and 7, in order to communicate the medium supply unit 30 with the composite member 20, the vector transmission rod has a medium conveying channel 51, that is, along the extension direction of the vector transmission rod 50, at least part of the interior of the vector transmission rod 50 is hollow, so as to form the medium conveying channel 51 for the fluid medium to flow. A first end of the medium conveying channel 51 communicates with the composite member 20, so that the fluid medium may be conveyed to a position of the composite member 20 via the medium conveying channel 51.

An axis of the driving shaft of the power member may be spaced from the main extension line 103. For example, the driving shaft of the power member may be located at one side of the vector transmission rod 50, with a power adapter between them, which realizes the power transmission through the power adapter.

In some embodiments, one end of the vector transmission rod 50 far away from the composite member 20 penetrates into the vector generation unit 40 from an end of the vector generation unit 40 close to the composite member 20, and passes through the vector generation unit 40 from an end of the vector generation unit 40 far away from the composite member 20. That is, in the direction of the main extension line 103, the vector transmission rod 50 penetrates into the power member of the vector generation unit.

In this way, the size occupied by the vector generation unit 40 in the uneven housing 10 may be reduced, and the circumferential size of the integrated oral care apparatus may be reduced, which is easy for the user to grip.

According to different assembly requirements, the vector transmission rod 50 may be a bent rod. In some embodiments, the vector transmission rod 50 may also extend along the main extension line 103, that is, the vector transmission rod 50 is a straight rod with a relatively simple structure, and has a smaller occupation space When the vector transmission rod 50 is a straight rod, the vector transmission rod 50 may extend along the main extension line 103, and the medium conveying channel 51 penetrates through one end of the vector transmission rod 50 far away from the composite member 20 and one end of the vector transmission rod 50 close to the composite member 20. That is, the vector transmission rod 50 is a hollow rod with a hollow interior, so that the end of the vector transmission rod 50 away from the composite member 20 is used for introducing the fluid medium. Accordingly, the medium supply unit 30 may be arranged at the end of the vector generation unit 40 far away from the composite member 20, so as to reduce the circumferential size of the integrated oral care apparatus and make it easy for the user to grip.

In some embodiments, a center line of the medium conveying channel 51 may also be arranged on the main extension line 103, that is, it may be understood that the center line of the medium conveying channel 51 is used as the main extension line 103 of the integrated oral care apparatus, and the uneven housing 10 is arranged outside the circumference of the vector transmission rod 50.

Considering that when the integrated oral care apparatus is in operation, the vector transmission rod 50 will swing or vibrate under the drive of the vector generation unit 40, and when the medium supply unit 30 is in operation, for example, when the integrated oral care apparatus is in a mode of tooth rinsing or a mixed mode, the medium supply unit 30 and the vector transmission rod 50 will vibrate simultaneously, a relative vibration amplitude at a connection position between the medium supply unit 30 and the vector transmission rod 50 is relatively large.

To avoid a leakage, referring to FIGS. 1 to 5, in some embodiments, the integrated oral care apparatus further includes a medium delivery member 60, which is configured to bridge between the vector generation unit 40 and the medium supply unit 30, that is, the medium delivery member 60 is connected between the vector generation unit 40 and the medium supply unit 30. The medium delivery member 60 may be understood as a connecting component that is connected between the vector generation unit 40 and the medium supply unit 30, that is, the vector transmission rod 50 is connected with the medium supply unit 30 through the medium delivery member 60.

The medium delivery member 60 has a communication channel 61 for the fluid medium to flow, and the communication channel 61 is hermetically coupled to a second end of the medium conveying channel 51 and is in sealed communication with the medium supply unit 30.

In this way, on the one hand, the communication channel 61 communicates with the second end of the medium conveying channel 51 and the medium supply unit 30, and the fluid medium provided by the medium supply unit 30 may be delivered to a position of the composite member 20 through the communication channel 61 and the medium conveying channel 51 in sequence, so as to assist the user in accelerating the removal of foreign substances in the oral cavity.

Furthermore, the second end of the medium conveying channel 51 and the medium supply unit 30 are sealed by the medium delivery member 60. That is, a sealing between the medium supply unit 30 and the vector transmission rod 50 is divided into two sealing steps, namely, a sealing between the medium delivery member 60 and the medium supply unit 30 and a sealing between the medium delivery member 60 and the vector transmission rod 50. At this time, a vibration amplitude of the vector transmission rod 50 relative to the medium delivery member 60 and a vibration amplitude of the medium supply unit 30 relative to the medium delivery member 60 are both smaller, and the damage to the sealing structure between the vector transmission rod 50 and the medium supply unit 30 is smaller. Compared with a single-point sealing in the related art, the present embodiment realizes a sealing in a preset length range by setting the medium delivery member 60 and the sealing structures at its both ends, so as to disperse the influence of the pressure from the fluid medium; and there is better sealing effect between the vector transmission rod 50 and the medium supply unit 30.

Furthermore, by providing the medium conveying channel 51 in the vector transmission rod 50 and the communication channel 61 in the medium delivery member 60, the fluid medium may be conveyed to the composite member 20. Compared with the technical solution in the related art, where the accommodating cavity of the toothbrush handle is provided with a conveying pipe communicated with the channel of the toothbrush head and the conveying pipe is located at one side of the accommodating cavity, in the present embodiment, the medium supply unit 30 supplies the fluid medium required for removing foreign substances to the composite member 20 through the vector transmission rod 50, and there is no need to additionally arrange a conveying pipe in the uneven housing 10, so that an uneven contour size between the composite member 20 and the vector generation unit 40 may be reduced, thereby making the overall contour of the uneven housing 10 smaller, so as to improve the user's gripping comfort.

In some embodiments, referring to FIGS. 1 to 6, the integrated oral care apparatus further includes a first sealing member 70 configured to be elastic, that is, the first sealing member 70 is an elastic member, for example, the first sealing member 70 is a rubber member or a silicone member.

The first sealing members 70 are at least partially filled in an assembly gap between the medium delivery member 60 and the vector transmission rod 50 and an assembly gap between the medium delivery member 60 and an outlet end of the medium supply unit 30, respectively.

That is, along the flow direction of the fluid medium, at least part of the assembly gaps is provided with the first sealing member 70 to seal the assembly gap. In some embodiments, the first sealing members 70 may be arranged in a part of the assembly gaps between the medium delivery member 60 and the vector transmission rod 50 and a part of the assembly gaps between the medium delivery member 60 and the outlet end of the medium supply unit 30, which has lower sealing cost and is easy to assemble.

By arranging the first sealing member 70 in the assembly gap, the first sealing members 70 may have elastic extrusion deformation, and seal the assembly gap between the medium delivery member 60 and the vector transmission rod 50 and the assembly gap between the medium delivery member 60 and the outlet end of the medium supply unit 30, so as to prevent the fluid medium from leaking between the medium supply unit 30 and the medium delivery member 60 and between the medium delivery member 60 and the vector transmission rod 50.

Meanwhile, because the first sealing member 70 is the elastic member, it may cushion the vibration of the vector transmission rod 50 and the medium supply unit 30, that is, a vibration amplitude of the end of the vector transmission rod 50 relative to the medium delivery member 60 and a vibration amplitude of the medium supply unit 30 relative to the medium delivery member 60 are both smaller, the extrusion deformation of the first sealing member 70 caused by vibration is relatively small, a fatigue life of the first sealing member 70 is relatively long, and the sealing effect between the vector transmission rod 50 and the medium supply unit 30 is better.

The first sealing member 70 may be a solid structure, such as a rubber ring or a silicone ring, and its structure is relatively simple.

In some embodiments, the first sealing member 70 may also have an expansion cavity 71, that is, the first sealing member 70 has a cavity structure inside, and the expansion cavity 71 penetrates through an outer wall surface of the first sealing member 70. The fluid medium is configured to be filled in the expansion cavity 71 through the assembly gap, that is, the fluid medium may be transported into the expansion cavity 71 through the assembly gap.

In this way, during the process of the fluid medium being delivered to the composite member 20, the first sealing member 70 may be filled with the fluid medium, and under the extrusion of the fluid medium, a volume of the expansion cavity 71 may be enlarged, and a side wall of the expansion cavity 71 will have an expansion deformation. Correspondingly, the first sealing member 70 will expand and deform, and the first sealing member 70 will be squeezed into the assembly gap.

That is, by providing the expansion cavity 71 in the first sealing member 70, an extrusion deformation degree of the first sealing member 70 in the assembly gap may be increased by a pressure of the fluid medium, thereby improving the sealing effect.

In some embodiments, the greater the pressure of the fluid medium is, the greater the deformation degree of the side wall of the expansion cavity 71 is, and the better the sealing effect of the first sealing member 70 is.

The first sealing member 70 may be provided with a plurality of expansion cavities 71, which are arranged at intervals along a circumferential direction of the communication channel 61 and do not communicate with each other. In this way, when the first sealing member 70 is clamped in the assembly gap, a sealing degree of the first sealing member 70 at different positions in its circumferential direction may be set differently.

In some embodiments, the expansion cavity 71 can also extend along the circumferential direction of the communication channel 61, and an extension length of the expansion cavity 71 can be set according to requirements. For example, the expansion cavity 71 is annular and is arranged around the communication channel 61. In this way, the sealing effect at different positions in the circumferential direction of the communication channel 61 is approximately the same, and the sealing effect is better.

In some embodiments, the first sealing member 70 includes a fixing portion 72 and expansion portions 73, and the expansion portions 73 are multiple, such as two, three or more. The present embodiment is explained by taking the first sealing member 70 having two expansion portions as an example. A cross-sectional shape of the first sealing member 70 is approximately Y-shaped, and the structure of the first sealing member 70 is relatively simple.

A plurality of expansion portions 73 are connected to the same end of the fixing portion 72 along the flow direction of the fluid medium, that is, one end of each expansion portion 73 is connected to the fixing portion 72, and the other end is a free end, and the expansion portion 73 can bend and deform with its end connected to the fixing portion 72 as a support.

The plurality of expansion portions 73 are arranged at intervals along a radial direction of the communication channel 61, and two adjacent expansion portions 73 enclose to form the expansion cavity 71.

It can be understood that when the first sealing member 70 is clamped in the assembly gap, the fixing portion 72 is in a state of extrusion deformation to seal the assembly gap. At this time, the two expansion portions can be deformed toward one side that is close to each other in the assembly gap.

When the fluid medium is used in the integrated oral care apparatus, the fluid medium enters the expansion cavity 71. And under the extrusion of the fluid medium, the two adjacent expansion portions 73 can move away from each other along the radial direction of the communication channel 61 and be extruded on the side wall of the assembly gap. For example, when the number of the expansion portions 73 is two and the two expansion portions 73 are arranged in the assembly gap between the medium delivery member 60 and the vector transmission rod 50, one expansion portion 73 abuts against the medium delivery member 60 and the other expansion portion 73 abuts against the vector transmission rod 50.

In some embodiments, when the expansion cavity 71 is annular and encloses the outer side of the communication channel 61, accordingly, the expansion portion 73 is also annular. At this time, the free ends of two adjacent expansion portions 73 form an annular opening of the expansion cavity 71, and the opening size of the expansion cavity 71 is relatively large, so that the fluid medium can easily flow into the expansion cavity 71.

As for the communication channel 61 of the medium delivery member 60, it may extend in a straight line direction. For example, a center line of the communication channel 61 is arranged along the main extension line 103, and at this time, the center line of the outlet end of the medium supply unit 30 is also arranged along the main extension line 103. The communication channel 61 can also be configured to be bent, that is, the ports at both ends of the communication channel 61 are staggered, so that the vector transmission rod 50 and the outlet end of the medium supply unit 30 can be staggered, and the assembly difficulty of the integrated oral care apparatus is relatively low.

In some embodiments, when the communication channel 61 is bent, the medium delivery member 60 includes an lead-in section 62 and an lead-out section 63 which are mutually communicated, and the inner cavities of the lead-in section 62 and the lead-out section 63 are mutually communicated, where the lead-out section 63 is connected with the vector transmission rod 50 in an insertion matching manner, and the lead-in section 62 is connected with the outlet end of the medium supply unit 30 in an insertion matching manner. In this way, the fluid medium conveyed by the outlet end of the medium supply unit 30 can be conveyed into the vector transmission rod 50 through the lead-in section 62 and the lead-out section 63 in sequence.

Where, a center line of the lead-in section 62 and a center line of the lead-out section 63 may have an included angle, for example, the lead-in section 62 is inclined relative to the main extension line 103, so as to be suitable for the assembly requirements of the medium supply unit 30.

In some embodiments, a center line of an inner cavity of the lead-in section 62 and a center line of an inner cavity of the lead-out section 63 can be spaced apart, that is, the center line of the inner cavity of the lead-in section 62 is parallel to the main extension line 103. Correspondingly, there is a connection section 64 between the lead-in section 62 and the lead-out section 63, and both ends of the connection section 64 communicate with the lead-in section 62 and the lead-out section 63 respectively.

Since the center line of the inner cavity of the lead-in section 62 is arranged in parallel with the main extension line 103, a strict centering between the outlet end of the medium supply unit 30 and the vector transmission rod 50 can be avoided, and the assembly difficulty of the medium supply unit 30 and the vector generation unit 40 is relatively low. And since the center line of the inner cavity of the lead-in section 62 extends along the direction of the main extension line 103, the medium supply unit 30 correspondingly extends along the direction of the main extension line 103, and does not occupy too much circumferential space of the integrated oral care apparatus. That is, the integrated oral care apparatus has smaller radial size and is easy for users to grip.

The medium delivery member 60 and the vector transmission rod 50, as well as the medium delivery member 60 and the outlet end of the medium supply unit 30 may have different assembling ways, and the present embodiment is not further limited. Exemplarily, the vector transmission rod 50 is sleeved on the outside of the medium delivery member 60, and the outlet end of the medium supply unit 30 is connected to the lead-in section 62 in an insertion manner.

In some embodiments, the present embodiment is explained by taking the vector transmission rod 50 inserted into and connected to the lead-out section 63 and the outlet end of the medium supply unit 30 inserted into and connected to the lead-in section 62 as examples. At this time, the structures of the vector transmission rod 50 and the outlet end of the medium supply unit 30 do not need to be greatly changed, and thus the manufacturing cost is lower.

In this way, the first sealing members 70 are sandwiched between the inner wall surface of the lead-in section 62 and the outer wall surface of the outlet end of the medium supply unit 30, and between the inner wall surface of the lead-out section 63 and the outer wall surface of the vector transmission rod 50, respectively.

In some embodiments, the inner wall surfaces of both ends of the communication channel 61 may also be provided with mounting grooves 65 respectively, and the first sealing member 70 is mounted in the mounting groove 65, and correspondingly, the openings of the expansion cavities 71 of the first sealing members 70 at both ends of the communication channel 61 are oppositely arranged.

The depression depth of the mounting groove 65 in the radial direction of the communication channel 61 is smaller than the dimension of the first sealing member 70 in the radial direction of the communication channel 61, so that part of the first sealing member 70 can extend into the communication channel 61 in the radial direction of the communication channel 61 and abut against the vector transmission rod 50 or the outlet end of the medium supply unit 30.

Meanwhile, by providing the mounting groove 65, an assembly gap between the vector transmission rod 50 and the medium delivery member 60 and an assembly gap between the medium supply unit 30 and the medium delivery member 60 are smaller, so that the medium delivery member 60 can have a larger wall thickness and a higher strength. In addition, by setting a smaller fit clearance, an insertion-connecting between the vector transmission rod 50 and the medium delivery member 60 and an insertion-connecting between the medium supply unit 30 and the medium delivery member 60 can be limited in position, and an excessive skew between the vector transmission rod 50 and the medium delivery member 60 and between the medium supply unit 30 and the medium delivery member 60 can be avoided.

Figure 5:
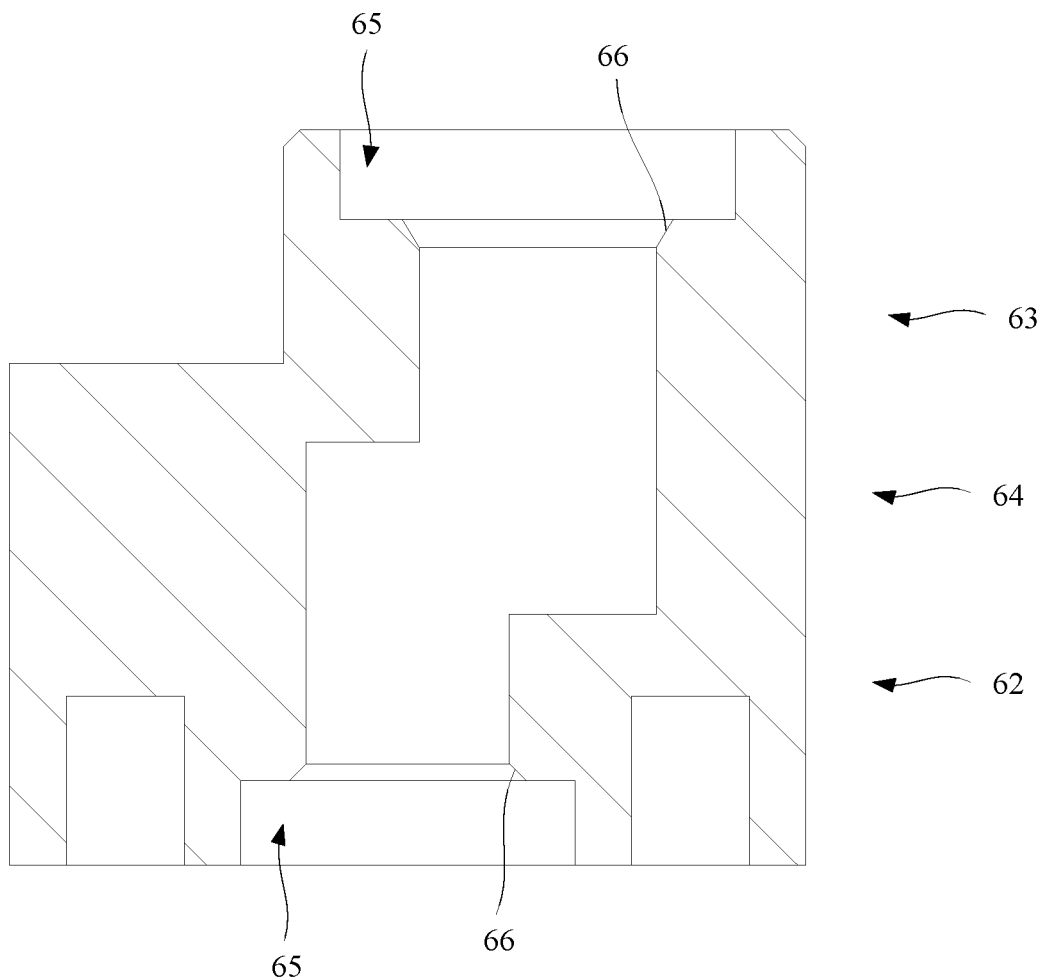
FIG. 5 is a structural schematic diagram of a medium delivery member according to some embodiments of the present application.
Figure 6:
FIG. 6 is a structural schematic diagram of a first sealing member according to some embodiments of the present application.
Figure 7:
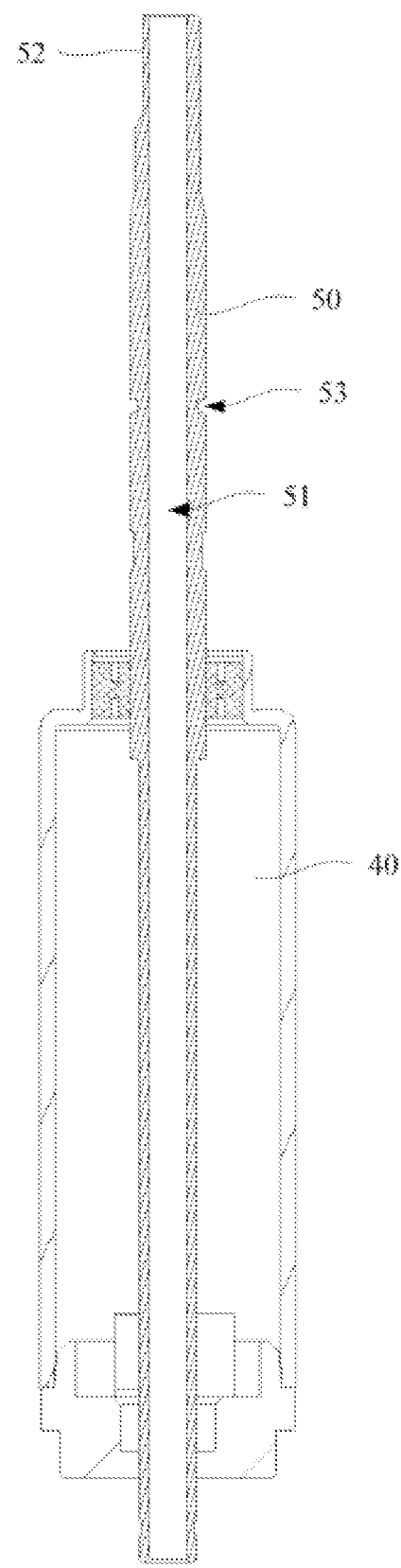
FIG. 7 is a structural schematic diagram of a vector generation unit and a vector transmission rod according to some embodiments of the present application.
Figure 8:
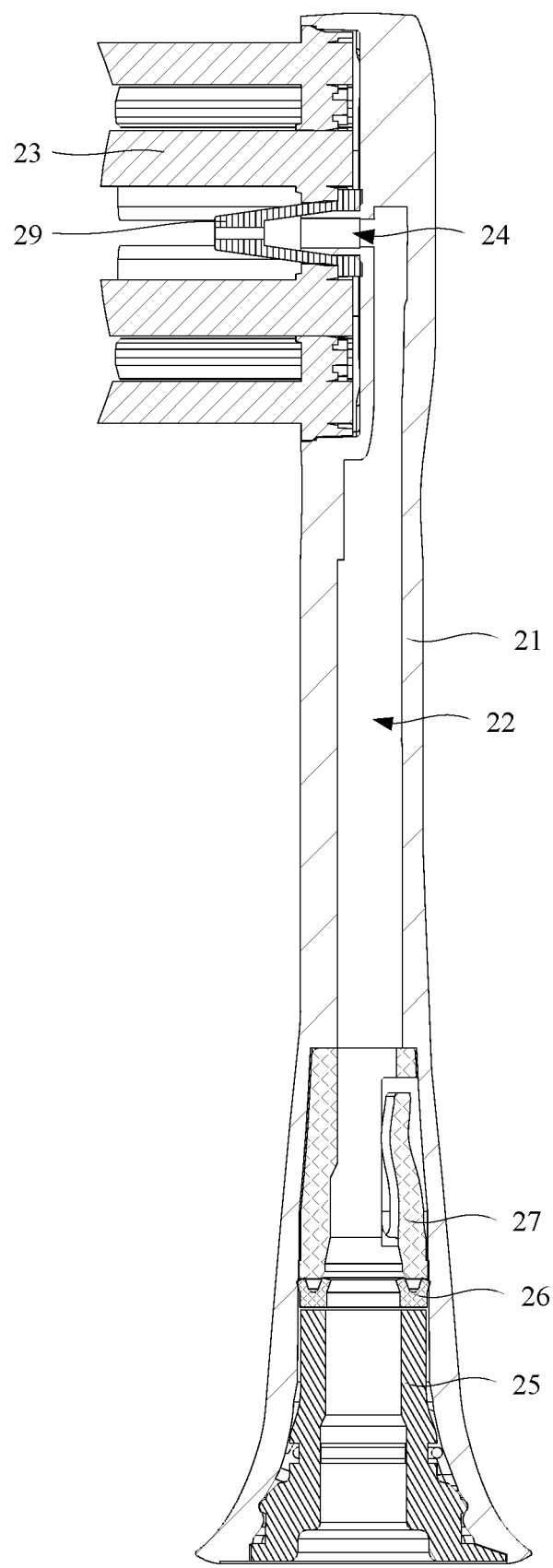
FIG. 8 is a structural schematic diagram of a composite member according to some embodiments of the present application.

In some embodiments, the mounting grooves 65 can also penetrate through an end face of the medium delivery member 60 in the direction of the main extension line 103 (as shown in FIG. 5), so that the mounting grooves 65 are exposed at both ends of the medium delivery member 60, and the first sealing member 70 is easy for assembling.

In some embodiments, considering that the assembly gap is usually smaller, and the opening end of the expansion cavity 71 is usually abutted against the inner wall surface of the mounting groove 65, the inner wall surface of the communication channel 61 may also be provided with a guiding inclined plane 66, which is arranged at an opening end of the expansion cavity 71 of the first sealing member 70, and forms an angle with the flow direction of the fluid medium and extends to the mounting groove 65, so that a situation that the inner wall surface of the mounting groove 65 blocks the opening of the expansion cavity 71 may be prevented, and the fluid medium may enter into the expansion cavity 71 via the guiding inclined plane 66.

An inclination angle of the guiding inclined plane 66 can be set as required, as long as the guiding inclined plane 66 points to the opening of the expansion cavity 71. The extension length of the guiding inclined plane 66 along the main extension line 103 may be smaller than an insertion lengths between the medium delivery member 60 and the vector transmission rod 50 and between the medium delivery member 60 and the medium supply unit 30, so as to avoid affecting an insertion matching between the medium delivery member 60 and the vector transmission rod 50 and between the medium delivery member 60 and the medium supply unit 30.

In some embodiments, the medium supply unit 30 includes a medium conveying mechanism 31 and a medium container 32 arranged in the uneven housing 10, so as to protect the medium conveying mechanism 31 and the medium container 32 through the uneven housing 10 and simplify the appearance of the integrated oral care apparatus.

The medium container 32 is a cavity that is arranged in the uneven housing 10 for storing the fluid medium to be used, that is, in the present embodiment, the medium container 32 is arranged in the uneven housing 10, which is convenient for the user to carry.

The medium conveying mechanism 31 can be a pumping assembly arranged in the uneven housing 10, which is configured for providing power to the fluid medium and driving the fluid medium to flow.

In some embodiments, the pumping assembly may include a gear pump, a diaphragm pump or a piston pump, etc. The pumping mechanism communicates with the bottom of the medium container 32 through a conveying pipe 33, which can be arranged along the extension direction of the main extension line 103 and located between the medium conveying mechanism 31 and the medium container 32. When the pumping assembly is activated, the fluid medium in the medium container 32 is led out by negative pressure suction.

The medium conveying mechanism 31 has a medium outflow end 312 and a medium inflow end 311. The medium outflow end 312 communicates with the communication channel 61, that is, the medium outflow end 312 constitutes the outlet end of the medium supply unit 30, and the medium inflow end 311 communicates with the medium container 32 through a pipeline. Specifically, one end of the conveying pipe 33 is communicated with the medium inflow end 311 of the medium conveying mechanism 31, and the other end of the conveying pipe 33 is communicated with the bottom of the medium container 32. When it is necessary to convey the fluid medium to the composite member 20, the medium conveying mechanism 31 starts to work, and the fluid medium in the medium container 32 can be sucked into the medium conveying channel 51 under the suction effect of the medium conveying mechanism 31, and then conveyed to the composite member 20 through the medium conveying channel 51.

The medium container 32 is arranged on a side deviated from the main extension line 103, that is, the vector generation unit 40 and the medium conveying mechanism 31 are arranged on the main extension line 103, and the medium container 32 is arranged on a side direction of the medium conveying mechanism 31. In this way, the medium container 32 can have a larger volume in the direction of the main extension line 103 on the basis of reducing the length of the integrated oral care apparatus.

In some embodiments, along the extension direction of the main extension line 103, the medium conveying mechanism 31 is spaced apart from the vector generation unit 40 by a preset distance, so that the medium delivery member 60 is arranged between the medium conveying mechanism 31 and the vector generation unit 40. The medium conveying mechanism 31 is located on a side of the vector generation unit 40 away from the composite member 20, that is, the composite member 20 and the medium conveying mechanism 31 are respectively arranged at opposite ends of the vector generation unit 40 along the main extension line 103, so as to convey the fluid medium through the medium conveying channel 51 located in the vector transmission rod 50.

In some embodiments, the medium container 32 includes an outer wall and an inner wall 106, where the outer wall is a peripheral side wall of the uneven housing 10; and the outer wall is integrated with the bionic gripping surface, that is, the bionic gripping surface is an outer wall surface of the outer wall.

The inner wall 106 is an inner wall plate provided in the uneven housing 10. The inner wall 106 is connected with the outer wall and extends along the main extension line 103. One end of the inner wall 106 extends to the second end 102 of the uneven housing 10 and is hermetically connected with the inner side wall of the second end 102 of the uneven housing 10. The other end of the inner wall 106 extends to the first end 101 of the uneven housing 10 and is hermetically connected with the inner side wall of the first end 101 of the uneven housing 10, so that the inner wall 106 and the outer wall form a closed special-shaped cavity extending along the main extension line 103, and the closed special-shaped cavity stores the fluid medium.

That is, the inner wall 106 divides the inner cavity of the uneven housing 10 into two mutually independent parts, where, one part constitutes the medium container 32 for storing the fluid medium, and the other part is configured for mounting the medium supply unit 30, the vector generation unit 40, and the like.

In some embodiments, a distance of the first profiling gripping surface 104 relative to the main extension line 103 varies from being equal to being gradually decreased, from the first end 101 of the uneven housing 10 to the second end 102 of the uneven housing 10, along the extension direction of the main extension line 103.

In the present embodiment, the distance between the first profiling gripping surface 104 and the main extension line 103 changes obviously, so the first profiling gripping surface 104 can be taken as an example for explanation.

A distance between a portion of the first profiling gripping surface 104 that is located at the first end 101 of and the middle part of the uneven housing 10 and the main extension line 103 is equal, and a distance between a portion of the first profiling gripping surface 104 that is located at the second end 102 of the uneven housing 10 and the main extension line 103 gradually decreases, that is, an outer diameter of the contour of the second end 102 of the uneven housing 10 gradually decreases.

In some embodiments, when the composite member 20 is installed on the uneven housing 10, the outer wall surface of the composite member 20 and the bionic gripping surface can form a smooth transition, and the integrated oral care apparatus has a simple appearance and is easy for users to grip.

In some embodiments, referring to FIGS. 8 to 12, the composite member 20 includes a support head 21 which is connected with an end of the vector transmission rod 50 far away from the vector generation unit 40 in a latching manner, that is, the support head 21 is detachably installed at the end of the vector transmission rod 50 far away from the vector generation unit 40. With this arrangement, when the composite member 20 needs to be replaced after long-term use, it is convenient to disassemble the composite member 20 from the vector transmission rod 50.

The composite member 20 may be a toothbrush head or a nozzle. When a user needs to brush his teeth, the toothbrush head is installed on the vector transmission rod 50; and when the user needs to rinse his teeth, the nozzle may be installed on the vector transmission rod 50. With this arrangement, a combined tooth brushing/tooth rinsing system can be realized through an uneven housing 10 with a profiling gripping surface, a set of vector generation units 40 and medium supply units 30, thereby realizing the functions of teeth brushing and teeth rinsing.

In some embodiments, the support head 21 is internally provided with a medium guide channel 22 communicating with the medium conveying channel 51, and a center line of the medium guide channel 22 is arranged on the main extension line 103, so that the composite member 20 mounted on the vector transmission rod 50 can be located on the same line with the vector transmission rod 50, which can improve the vector transmission efficiency of the vector transmission rod 50 to the composite member 20 and avoid vector loss.

The support head 21 has a bristle planting surface provided with a plurality of planting holes, and bundles of bristles 23 are planted on the bristle planting surface at intervals, that is, the bristles 23 are embedded in the planting holes to form a toothbrush head structure.

In this way, the user can perform teeth brushing, teeth rinsing, or both teeth brushing and teeth rinsing simultaneously through the same composite member 20 to simplify the structure of the integrated oral care apparatus.

In some embodiments, the depth of bundles of bristles 23 planted on the bristle planting surface is not more than the distance from the bristle planting surface to the main extension line 103, that is, the bristles 23 are embedded in the bottom of the planting holes, and the planting holes do not extend to the main extension line 103, so as to prevent the bristles 23 from extending into the medium guide channel 22 and affecting the flow path of the fluid medium in the medium guide channel 22.

The bristle planting surface is provided with a splash hole 24 communicating with the medium guide channel 22. There may be one or more splash holes 24, which are located on the bristle planting surface. And the splash hole 24 can be arranged perpendicular to the bristle planting surface, or the splash hole 24 can be obliquely arranged relative to the bristle planting surface. Exemplarily, the bristle planting surface is provided with a guide protrusion 211, and the splash hole 24 penetrates through both ends of the guide protrusion 211. The present embodiment is not limited to this.

In some embodiments, the splash hole 24 may be located in a gap between adjacent bristles 23 and extend in the direction perpendicular to the bristle planting surface. One end of the splash hole 24 can extend into the medium guide channel 22 and communicate with the medium guide channel 22, so that the fluid medium located in the medium guide channel 22 can flow to a target area through the splash hole 24.

In some embodiments, a nozzle member 29 may also be arranged at the splash hole 24, and be opposite to the splash hole 24. For example, the nozzle member 29 is socketed to the guide protrusion 211, so that the fluid medium can be guided out through the nozzle member 29 with a better guiding effect, and a fluid column sprayed through the nozzle member 29 is not easy to disperse, thereby rinsing a part to be cleaned (such as a tooth gap) of the user's oral cavity.

The nozzle member 29 may be a plastic part with lower hardness. A height of the nozzle member 29 is smaller than that of the bristles 23, so as to prevent the nozzle member 29 from hurting the mouth of the user, and the user has a good use feeling. In addition, since the nozzle member 29 has a smaller hardness, an oscillation amplitude of the fluid column can be relatively small during the oscillation of the composite member 20, which is easy for the user to clean the oral cavity.

Figure 9:
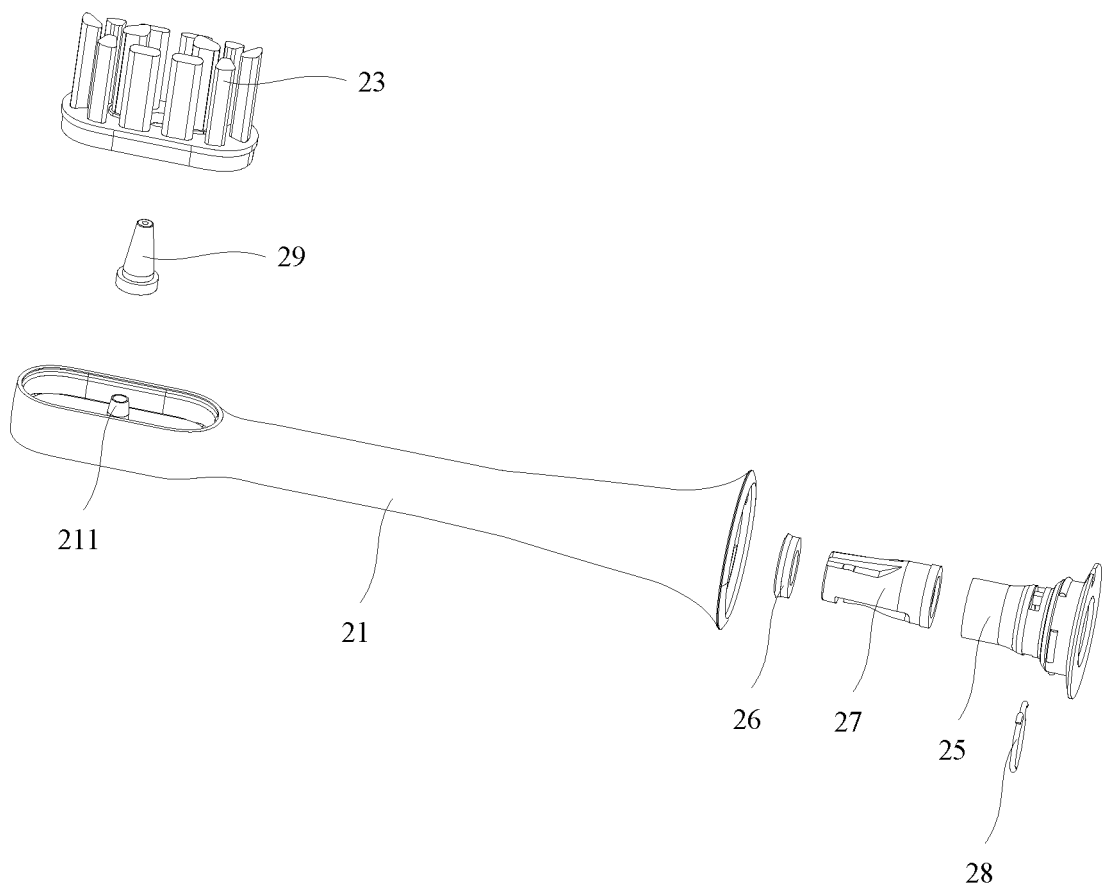
FIG. 9 is an exploded structural schematic diagram of the composite member in FIG. 8.
Figure 10:
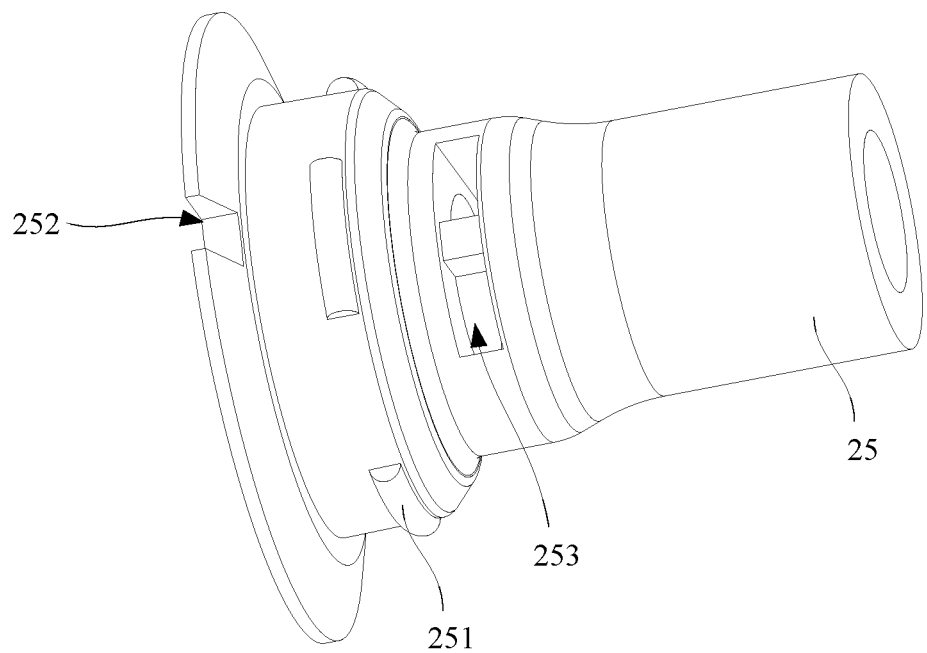
FIG. 10 is a structural schematic diagram of a first spatial position holding member according to some embodiments of the present application.
Figure 11:
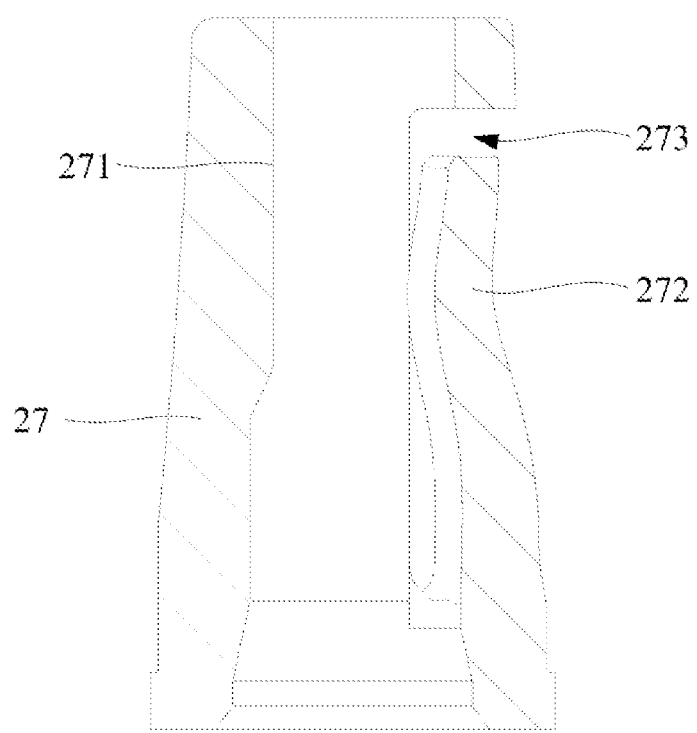
FIG. 11 is a structural schematic diagram of a second spatial position holding member according to some embodiments of the present application.
Figure 12:
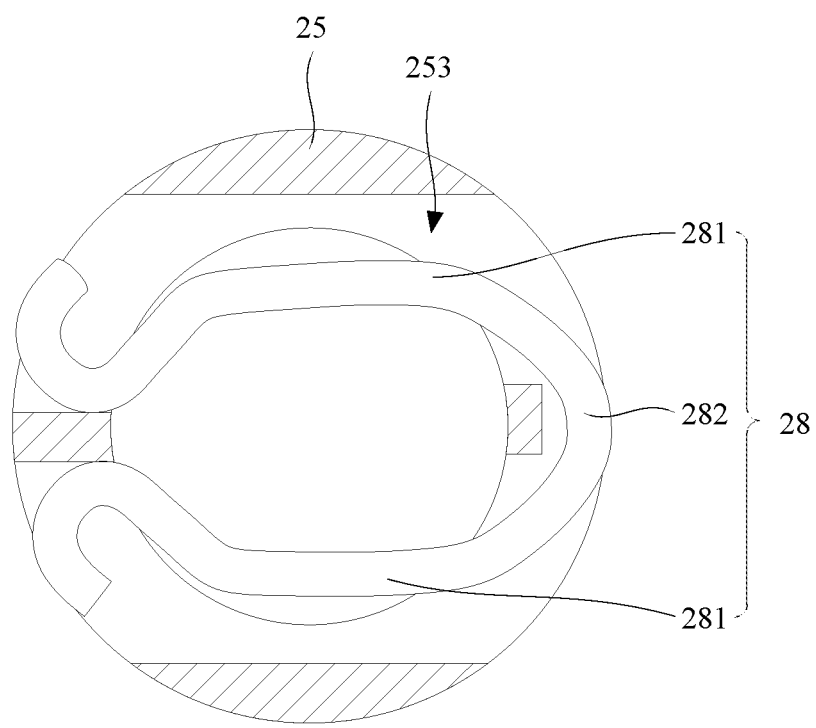
FIG. 12 is a structural schematic diagram of the connection between an elastic clamping member and the first spatial position holding member according to some embodiments of the present application.

In some embodiments, for the convenience of assembly, as shown in FIG. 9, the support head 21 may include a support head body and a bristle planting member, on which the splash hole 24 and the bristles 23 are arranged; the medium guide channel 22 is arranged on the support head body; and the bristle planting member can be fixedly connected by ultrasonic pressing, so that the fixing stability is higher. Where, the nozzle member 29 is press-fitted between the bristle planting member and the support head body, forming a sealing effect to prevent the fluid medium from leaking at the splash hole 24.

In some embodiments, an inner pore size of the medium guide channel 22 is matched with an outer diameter of the vector transmission rod 50, so that the vector transmission rod 50 can be inserted into the medium guide channel 22.

The medium guide channel 22 has a bonding surface 271 parallel to the main extension line 103, and correspondingly, a part of the vector transmission rod 50 that is located in the medium guide channel 22 has a milling plane 52 which is matched with the bonding surface 271. When the vector transmission rod 50 is inserted into the medium guide channel 22, the milling plane 52 of the vector transmission rod 50 and the bonding surface 271 are in contact with each other.

In this way, when the composite member 20 is installed, the milling plane 52 can be used as an indicator to hint the installation angle of the composite member. For example, the bristles 23 and the milling plane 52 can both be located on the same side of the integrated oral care apparatus. When the user installs the composite member 20, the bristles 23 of the composite member 20 can be rotated to approximately the same position as the milling plane 52, and then the composite member 20 can be inserted into the housing, which is easy for centering alignment.

In addition, the milling plane 52 is matched with the bonding surface 271, and the vector transmission rod 50 can synchronously transmit its own swing to the composite member 20, which has higher transmission efficiency.

It should be noted that the above-mentioned bonding surface 271 has a certain distance from a port of the medium guide channel 22, so as to ensure that the vector transmission rod 50 has a certain insertion depth in the medium guide channel 22. That is, the end of the vector transmission rod 50 far away from the vector generation unit 40 is inserted into the medium guide channel 22 by a certain distance, which can improve a connection reliability and a sealing reliability therebetween.

In some embodiments, in order to realize a detachable connection of the composite member 20, the composite member 20 further includes a first spatial position holding member 25, a second sealing member 26 and a second spatial position holding member 27, which are arranged in the support head 21 along the flow direction of the fluid medium. The first spatial position holding member 25, the second sealing member 26 and the second spatial position holding member 27 are all ring-shaped members; and the first spatial position holding member 25, the second sealing member 26 and the second spatial position holding member 27 all have internal cavities which are communicated with each other and constitute part of the medium guide channel 22. In this way, when the vector transmission rod 50 is inserted into the composite member 20, the first spatial position holding member 25, the second sealing member 26 and the second spatial position holding member 27 are respectively matched with the vector transmission rod 50 at different positions in an insertion manner.

That is, the "spatial position holding" means that when the composite member 20 is connected with the vector transmission rod 50, the position of the composite member 20 relative to the vector transmission rod 50 is limited, so as to prevent the composite member 20 from rotating relative to the vector transmission rod 50 or separating from the vector transmission rod 50.

In some embodiments, the first spatial position holding member 25 is connected with the support head 21 in a clamping manner, so that the second sealing member 26 and the second spatial position holding member 27 can be fixed in the medium guide channel 22.

One of the first spatial position holding member 25 and the support head 21 may be provided with a clamping protrusion 251, and the other may be provided with a clamping groove. Exemplarily, the clamping protrusion 251 is provided on the first spatial position holding member 25, and the clamping groove is provided on the inner wall of the support head 21. When the clamping protrusion 251 extends into the clamping groove, the first spatial position holding member 25 can be fixed on the support head 21, which is easy for disassembling.

The bonding surface 271 may be provided on an inner wall of the support head 21, or the bonding surface 271 may be provided on an inner wall of the second spatial position holding member 27, which has a smaller size and is easy to process and mold.

In some embodiments, the second sealing member 26 is configured to fill at least part of a space between the vector transmission rod 50 and the support head 21, so that after the composite member 20 is connected with the vector transmission rod 50, the sealing may be performed by the second sealing member 26, thereby preventing the fluid medium from leaking at an insertion connecting position of the composite member 20 and the vector transmission rod 50.

In some embodiments, a cavity structure may also be arranged in the second sealing member 26 to optimize a sealing effect of the second sealing member 26. The sealing principle of the second sealing member 26 is the same as that of the first sealing member 70, which is not repeated in the present embodiment.

In some embodiments, the vector transmission rod 50 is in snap-fit connection with the first spatial position holding member 25, that is, through the snap-fit connection between the vector transmission rod 50 and the first spatial position holding member 25, a detachable connection between the vector transmission rod 50 and the composite member 20 can be realized.

In this way, by arranging the first spatial position holding member 25, the second sealing member 26 and the second spatial position holding member 27 on the support head 21, it is possible to avoid directly arranging a structure connected with the vector transmission rod 50 on the inner wall surface of the support head 21, and thus the manufacturing difficulty is relatively low.

In some embodiments, the first spatial position holding member 25 may be provided with a positioning groove 252, and the support head 21 can be correspondingly provided with a positioning protrusion. When the first spatial position holding member 25 is installed, the positioning protrusion can be aligned with the positioning groove 252 until the first spatial position holding member 25 extends into the support head 21 and the positioning protrusion extends into the positioning groove 252, which is easy for the first spatial position holding member 25 to install and convenient for operation.

In some embodiments, the second spatial position holding member 27 is provided with a connecting through hole 273, which communicates with inner and outer sides of the second spatial position holding member 27. The connecting through hole 273 is opposite to the bonding surface 271, that is, the connecting through hole 273 and the bonding surface 271 are arranged on opposite sides of the second spatial position holding member 27. The second spatial position holding member 27 is provided with an elastic arm 272, which is arranged in the connecting through hole 273. One end of the elastic arm 272 is connected to an inner wall surface of the connecting through hole 273, and the other end is a free end. The free end of the elastic arm 272 points to the inner side of the second spatial position holding member 27, so that when the vector transmission rod 50 is connected with the composite member 20 in an insertion manner, the elastic arm 272 is configured to be pressed against the vector transmission rod 50 by its own elastic structure. In this way, the end of the vector transmission rod 50 can be stably inserted into and matched with the second spatial position holding member 27, thereby preventing the composite member 20 from shaking relative to the vector transmission rod 50.

When the vector transmission rod 50 moves to the position of the elastic arm 272 in the process of installing the composite member 20, the user can know that the vector transmission rod 50 is about to be inserted into place through an elastic abutting between the vector transmission rod 50 and the elastic arm 272, that is, setting the elastic arm 272 may also be used to indicate that the composite member 20 is about to be installed in place.

In addition, when the integrated oral care apparatus is in operation, part of its vibration can be damped by the elastic arm 272, and the user has a better hand feeling when gripping the integrated oral care apparatus.

In some embodiments, the elastic arm 272 extends along the direction of the main extension line 103, and an abutting position between the elastic arm 272 and the vector transmission rod 50 may be an arc section, so that the elastic arm 272 and the vector transmission rod 50 will not be interfered with each other when the composite member 20 is disassembled and assembled, thus preventing the composite member 20 from being stuck on the vector transmission rod 50.

In some embodiments, the composite member 20 further includes an elastic clamping member 28, which can be a metal part or a plastic part. The elastic clamping member 28 is connected to the first spatial position holding member 25, and a clamping portion 281 of the elastic clamping member 28 extends into the inner cavity of the first spatial position holding member 25, that is, the clamping portion 281 of the elastic clamping member 28 is exposed in the inner cavity of the first spatial position holding member 25.

Correspondingly, the outer wall surface of the vector transmission rod 50 is provided with a clamping groove 53, which may be an annular groove and arranged on the circumferential outer wall surface of the vector transmission rod 50, and the clamping portion 281 of the elastic clamping member 28 may be clamped in the clamping groove 53 in an openable and closable manner. In this way, when the vector transmission rod 50 is inserted into the composite member 20, the elastic clamping member 28 can be closed and extended into the clamping groove 53, so that the composite member 20 and the vector transmission rod 50 can be clamped and fixed. Furthermore, it can resist the impact force of the fluid medium in the rinsing mode or the mixing mode, and prevent the composite member 20 from separating from the vector transmission rod 50.

When the composite member 20 is disassembled, the clamping portion 281 of the elastic clamping member 28 may be opened under the pressure of the vector transmission rod 50 and separated from the clamping groove 53, so that the composite member 20 is convenient for disassembling and assembling.

In some embodiments, the elastic clamping member 28 may be approximately U-shaped, including two clamping portions 281 and a bending portion 282 connecting the two clamping portions 281, and the two clamping portions 281 may move toward one side thereof that is close to each other under an elastic force of the bending portion 282. The opening and closing of the elastic clamping member 28 means that the two clamping portions 281 are away from each other or close to each other.

The side wall of the first spatial position holding member 25 is correspondingly provided with a mounting hole 253 through which the clamping portion 281 passes, so that the elastic clamping member 28 can be fixed on the first spatial position holding member 25, and the clamping portions 281 are exposed in the inner cavity of the first spatial position holding member 25.

The integrated oral care apparatus further includes a power supply module 81, a charging module 82 and a control panel 83, where along the direction of the main extension line 103, the power supply module 81 and the charging module 82 are sequentially arranged at the end of the medium conveying mechanism 31 away from the composite member 20 at intervals, that is, the power supply module 81 and the charging module 82 are sequentially arranged below the medium conveying mechanism 31. In some embodiments, the power supply module 81 and the charging module 82 are arranged along the extension direction of the main extension line 103.

The control panel 83 has a plurality of control buttons, which respectively control different working states of the integrated nursing apparatus. For example, among the control buttons, there is a switch button for controlling the on-off of power supply, and a button for selecting different modes.

The control panel 83 is arranged close to the second profiling gripping surface 105 of the uneven housing 10, and the second profiling gripping surface 105 is provided with through holes for exposing the above-mentioned control buttons, so that when the control panel 83 is installed in the uneven housing 10, the control buttons can protrude from the through holes, which is convenient for the user to operate the buttons.

In some embodiments, a soft rubber pad integrally formed with the uneven housing 10 may be provided at the through holes, and the soft rubber pad covers the through holes to prevent outside foreign substances from entering the uneven housing 10 through the through holes.

To facilitate the installation of the power supply module 81, the charging module 82, the vector generation unit 40 and the medium conveying mechanism 31 into the uneven housing 10, the integrated oral care apparatus provided by embodiments of the present application further includes a combination bracket 84 and a tail cover 89 arranged at the bottom end of the combination bracket 84. The combination bracket 84 has a plurality of mounting points, and the vector generation unit 40, the medium conveying mechanism 31 and the power supply module 81 can be sequentially pre-mounted on the combination bracket 84 along the extension direction of the main extension line 103, and the charging module 82 is mounted on the tail cover 89, which can be detachably mounted at the bottom of the combination bracket 84. Therefore, the integration level of the oral care apparatus can be improved, and the assembly efficiency can be improved.

In some embodiments, the first end 101 of the uneven housing 10 provided by the embodiment of the present application is provided with a closure cover 107, which is configured to seal the first end 101 of the uneven housing 10. A first cavity is formed between the closure cover 107 and the tail cover 89, and communicated with the medium container 32 that is located at one side of the uneven housing 10.

As shown in FIG. 4, the tail cover 89 is provided with a tail channel 891 communicating with the first cavity, and the tail channel 891 communicates with the medium inflow end 311 of the medium conveying mechanism 31 through the conveying pipe 33. Further, the first profiling gripping surface 104 forming the medium container 32 is provided with a supplementary medium port communicating with the medium container 32, and the fluid medium is supplemented into the medium container 32 through the supplementary medium port.

Further referring to FIG. 4, a waterproof member 85, a support member 86, a first shock absorbing pad 87 and a second shock absorbing pad 88 are provided in the combination bracket 84. The waterproof member 85 and the support member 86 are sequentially sleeved on the vector transmission rod 50 along the extension direction of the main extension line 103, and the waterproof member 85 seals the space between the outlet of the second end 102 of the uneven housing 10 and the vector transmission rod 50 to prevent liquid from entering the interior of the uneven housing 10.

The first shock absorbing pad 87 and the second shock absorbing pad 88 are sequentially sleeved on the vector generation unit 40, and the support member 86 is placed between the first shock absorbing pad 87 and the waterproof member 85 to support the waterproof member 85. The first shock absorbing pad 87 and the second shock absorbing pad 88 contact and abut against an inner wall of the combination bracket 84 respectively, to prevent the vibration vector from the vector generation unit 40 from being transmitted to the uneven housing 10, so as to improve the user's grip comfort.

In the present specification, the embodiments or implementations are described in a progressive way, and the differences between each embodiment and other embodiments are highlighted, so the same and similar parts of the embodiments can be referred to each other.

In the description of the present specification, description with reference to the terms "one embodiment", "some embodiments", "schematic embodiments", "example", "specific example" or "some examples" or the like means that the specific features, structures, materials or characteristics described in connection with the embodiments or examples are included in at least one embodiment or example of the present application. In the present specification, the schematic expressions of the above terms do not necessarily refer to the same embodiment or example. Furthermore, the specific features, structures, materials or characteristics described may be combined in any one or more embodiments or examples in a suitable manner.

Finally, it should be explained that the above embodiments are only used to illustrate the technical solution of the present application, but not to limit it. Although the application has been explained in detail with reference to the above embodiments, those ordinary skilled in the art should understand that they can still modify the technical solutions described in the above embodiments, or equivalently replace some or all of the technical features therein, and these modifications or substitutions do not make the essence of the corresponding technical solution deviate from the scope of the technical solutions of the embodiments of the present application.

What is claimed is:

1. An integrated oral care apparatus, comprising:
   an uneven housing, configured to have a bionic gripping surface suitable for gripping, wherein the bionic gripping surface is a surface which is suitable for a shape of a user's hand when the uneven housing is gripped by the user, and the uneven housing has a main extension line, and a first end and a second end which are oppositely arranged, and the main extension line extends from the first end of the uneven housing to the second end of the uneven housing;
   a composite member, configured to remove foreign substances in a target area, wherein the composite member is close to the second end of the uneven housing and is far away from the first end of the uneven housing;
   a medium supply unit, configured to provide the composite member with a fluid medium for accelerating a removal of the foreign substances;
   a vector generation unit at least partially added to the uneven housing, wherein the vector generation unit connects with the composite member through a vector transmission rod having a medium conveying channel with a first end that is communicated with the composite member;
   a medium delivery member, configured to be bridged between the vector generation unit and the medium supply unit, the medium delivery member having a communication channel configured for the fluid medium to flow, the communication channel is hermetically coupled between a second end of the medium conveying channel and the medium supply unit;
   first sealing members, configured to be elastic, the first sealing members being at least partially filled between the medium delivery member and the vector transmission rod;
   wherein
   each of the first sealing members is internally provided with an expansion cavity that penetrates through an outer wall surface of the first sealing member, and the fluid medium is configured to be filled in the expansion cavity through an assembly gap;
   wherein the first sealing member comprises a fixing portion and an expansion portion, the expansion portions are multiple, and multiple expansion portions are connected to a same end of the fixing portion along a flow direction of the fluid medium, and the multiple expansion portions are arranged at intervals along a radial direction of the communication channel, and two adjacent expansion portions enclose to form the expansion cavity.

2. The integrated oral care apparatus according to claim 1, wherein the first sealing members are at least partially filled in an assembly gap between the medium delivery member and an outlet end of the medium supply unit.

3. The integrated oral care apparatus according to claim 2, wherein the expansion cavity extends along a circumferential direction of the communication channel.

4. The integrated oral care apparatus according to claim 2, wherein the medium delivery member comprises a lead-in section and a lead-out section which are communicated with each other, the lead-out section is connected with the vector delivery rod in an insertion manner, and the lead-in section is connected with the outlet end of the medium supply unit in an insertion manner.

5. The integrated oral care apparatus according to claim 4, wherein a center line of an inner cavity of the lead-in section is spaced from a center line of an inner cavity of the lead-out section.

6. The integrated oral care apparatus according to claim 4, wherein the vector transmission rod is inserted into the lead-out section, and the outlet end of the medium supply unit is inserted into the lead-in section; inner wall surfaces of both ends of the communication channel are respectively provided with mounting grooves, the first sealing members are mounted in the mounting grooves, and openings of the expansion cavities of the first sealing members at both ends of the communication channel are oppositely arranged.

7. The integrated oral care apparatus according to claim 6, wherein the inner wall surface of the communication channel is provided with a guiding inclined plane, which is arranged at an open end of the expansion cavity of each of the first sealing members and has an included angle relative to the flow direction of the fluid medium and extends to the mounting groove.

8. The integrated oral care apparatus according to claim 1, wherein an end of the vector transmission rod far away from the composite member penetrates into the vector generation unit from an end of the vector generation unit close to the composite member, and passes through the vector generation unit from an end of the vector generation unit far away from the composite member.

9. The integrated oral care apparatus according to claim 8, wherein the vector transmission rod extends along the main extension line, and along an extension direction of the main extension line, the medium conveying channel penetrates through an end of the vector transmission rod far away from the composite member and an end of the vector transmission rod close to the composite member.

10. The integrated oral care apparatus according to claim 1, wherein the medium supply unit comprises a medium conveying mechanism and a medium container that are arranged in the uneven housing;

the medium container is arranged at one side deviated from the main extension line;

along the extension direction of the main extension line, the medium conveying mechanism is separated from the vector generation unit by a preset distance, and the medium conveying mechanism is located on a side of the vector generation unit far away from the composite member; the medium conveying mechanism has a medium outflow end and a medium inflow end, wherein the medium outflow end is communicated with the communication channel, and the medium inflow end is communicated with the medium container through a pipeline.

11. The integrated oral care apparatus according to claim 10, wherein the medium container comprises an outer wall which is integrated with the bionic gripping surface, and an inner wall which is connected with the outer wall and extends along the main extension line, and the inner wall and the outer wall enclose to form a closed special-shaped cavity extending along the main extension line, and the closed special-shaped cavity is configured to store the fluid medium.

12. The integrated oral care apparatus according to claim 1, wherein the bionic gripping surface comprises a first profiling gripping surface and a second profiling gripping surface which are asymmetrically distributed relative to the main extension line, and the first profiling gripping surface and the second profiling gripping surface are spliced to form a closed annular surface.

13. The integrated oral care apparatus according to claim 12, wherein a distance of the first profiling gripping surface relative to the main extension line varies from being equal to being gradually decreased, from the first end of the uneven housing to the second end of the uneven housing, along the extension direction of the main extension line.

14. The integrated oral care apparatus according to claim 1, wherein the composite member comprises a support head which is latchably connected with an end of the vector transmission rod far away from the vector generation unit, the support head is internally provided with a medium guide channel which is communicated with the medium conveying channel, and a center line of the medium guide channel is arranged on the main extension line;

the supporting head is provided with a bristle planting surface, and a plurality of bundles of bristles are planted on the bristle planting surface at intervals, and a depth of the plurality of bundles of bristles planted on the bristle planting surface is not more than a distance from the bristle planting surface to the main extension line; and the bristle planting surface is provided with a splash hole that is communicated with the medium guide channel.

15. The integrated oral care apparatus according to claim 14, wherein an inner pore size of the medium guide channel is matched with an outer diameter of the vector transmission rod;

the medium guide channel has a bonding surface parallel to the main extension line, wherein an end of the vector transmission rod far away from the vector generation unit is inserted into the medium guide channel by a certain distance, and a part of the vector transmission rod located in the medium guide channel has a milling plane matched with the bonding surface.

16. The integrated oral care apparatus according to claim 15, wherein the composite member further comprises a first spatial position holding member, a second sealing member and a second spatial position holding member, wherein the first spatial position holding member, the second sealing member and the second spatial position holding member are arranged in the support head along the flow direction of the fluid medium; the first spatial position holding member, the second sealing member and the second spatial position holding member all have internal cavities which are communicated with each other and constitute part of the medium guide channel; the first spatial position holding member is connected with the support head in a clamping manner, so as to fix the second sealing member and the second spatial position holding member in the medium guide channel;

wherein, the bonding surface is arranged on an inner wall surface of the second spatial position holding member, and the second sealing member is configured to fill at least part of a space between the vector transmission rod and the support head, and the vector transmission rod is connected with the first spatial position holding member in a clamping manner.

17. The integrated oral care apparatus according to claim 16, wherein the second spatial position holding member is provided with a connecting through hole which is opposite to the bonding surface, and the second spatial position holding member is provided with an elastic arm arranged in the connecting through hole, and the elastic arm is configured to press against the vector transmission rod through its own elastic structure.

18. The integrated oral care apparatus according to claim 16, wherein the composite member further comprises an elastic clamping member that is connected with the first spatial position holding member, and a clamping portion of the elastic clamping member extends into the internal cavity of the first spatial position holding member;

an outer wall surface of the vector transmission rod is provided with a clamping groove, and the clamping portion of the elastic clamping member is clamped in the clamping groove in an openable and closable manner.

* * * * *